United States Patent [19]
DeTemple et al.

[11] Patent Number: 5,572,653
[45] Date of Patent: Nov. 5, 1996

[54] REMOTE ELECTRONIC INFORMATION DISPLAY SYSTEM FOR RETAIL FACILITY

[75] Inventors: William C. DeTemple, Upland, Calif.; Peter Abell, Amherst, N.H.; E. Frederick Bird, Verdugo City; Milton L. Goff, Ramona, both of Calif.

[73] Assignee: Rest Manufacturing, Inc., Ramona, Calif.

[21] Appl. No.: 176,781

[22] Filed: Jan. 4, 1994

Related U.S. Application Data

[63] Continuation-in-part of Ser. No. 83,389, Jun. 28, 1993, abandoned, which is a continuation of Ser. No. 753,004, Aug. 23, 1991, abandoned, which is a continuation of Ser. No. 427,896, Oct. 24, 1989, abandoned, which is a continuation-in-part of Ser. No. 352,553, May 16, 1989, abandoned.

[51] Int. Cl.⁶ .................................................. G06F 15/00
[52] U.S. Cl. .............................. 395/501; 455/49.1; 40/5; 340/825.72; 345/2; 235/383
[58] Field of Search ..................... 395/162–166, 395/500, 200, 118; 364/405, 400, 464.01, 401, 465; 340/825.06, 825.07, 825.15, 825.72, 825.49, 825.35, 825.17; 40/5, 446, 454; 235/378, 383, 385, 454; 455/3.1, 4.1, 9, 14, 32.1, 39, 49.1, 132; 345/1, 2; 375/37

[56] References Cited

U.S. PATENT DOCUMENTS

| | | | |
|---|---|---|---|
| 4,002,886 | 1/1977 | Sundelin | 235/383 |
| 4,139,149 | 2/1979 | Crepeau et al. | 235/383 |
| 4,237,537 | 12/1980 | Pitches | 364/465 |
| 4,275,385 | 6/1981 | White | 340/825.49 |
| 4,438,432 | 3/1984 | Hurcum | 340/825.35 |
| 4,500,880 | 2/1985 | Gomersall et al. | 235/385 |
| 4,521,677 | 6/1985 | Sarwin | 235/385 |
| 4,588,881 | 5/1986 | Pejas et al. | 235/385 |
| 4,766,295 | 8/1988 | Davis et al. | 235/383 |
| 4,821,291 | 4/1989 | Stevens et al. | 375/37 |
| 4,855,908 | 8/1989 | Shimoda et al. | 364/405 |
| 4,882,724 | 11/1989 | Vela et al. | 364/401 |
| 4,888,709 | 12/1989 | Revesz et al. | 340/825.07 |
| 4,973,952 | 11/1990 | Malec et al. | 340/825.35 |
| 5,019,811 | 5/1991 | Olsson et al. | 340/825.17 |
| 5,198,644 | 3/1993 | Pfeiffer et al. | 235/383 |
| 5,287,266 | 2/1994 | Malec et al. | 364/401 |
| 5,313,569 | 5/1994 | Olsson et al. | 395/118 |

Primary Examiner—Kee M. Tung
Attorney, Agent, or Firm—Christie, Parker & Hale

[57] ABSTRACT

A system for communicating between a store computer and locations in the aisles of a retail facility. A hard wired grid connects the store computer to a plurality of transceivers located in zones throughout the facility and the transceivers establish a wireless link to the locations. One embodiment is a product information display system in which the locations are fixed information display terminals, such as price displaying shelf tags. Another embodiment is an item tracking system, in which the locations are movable shopping carts or baskets.

5 Claims, 7 Drawing Sheets

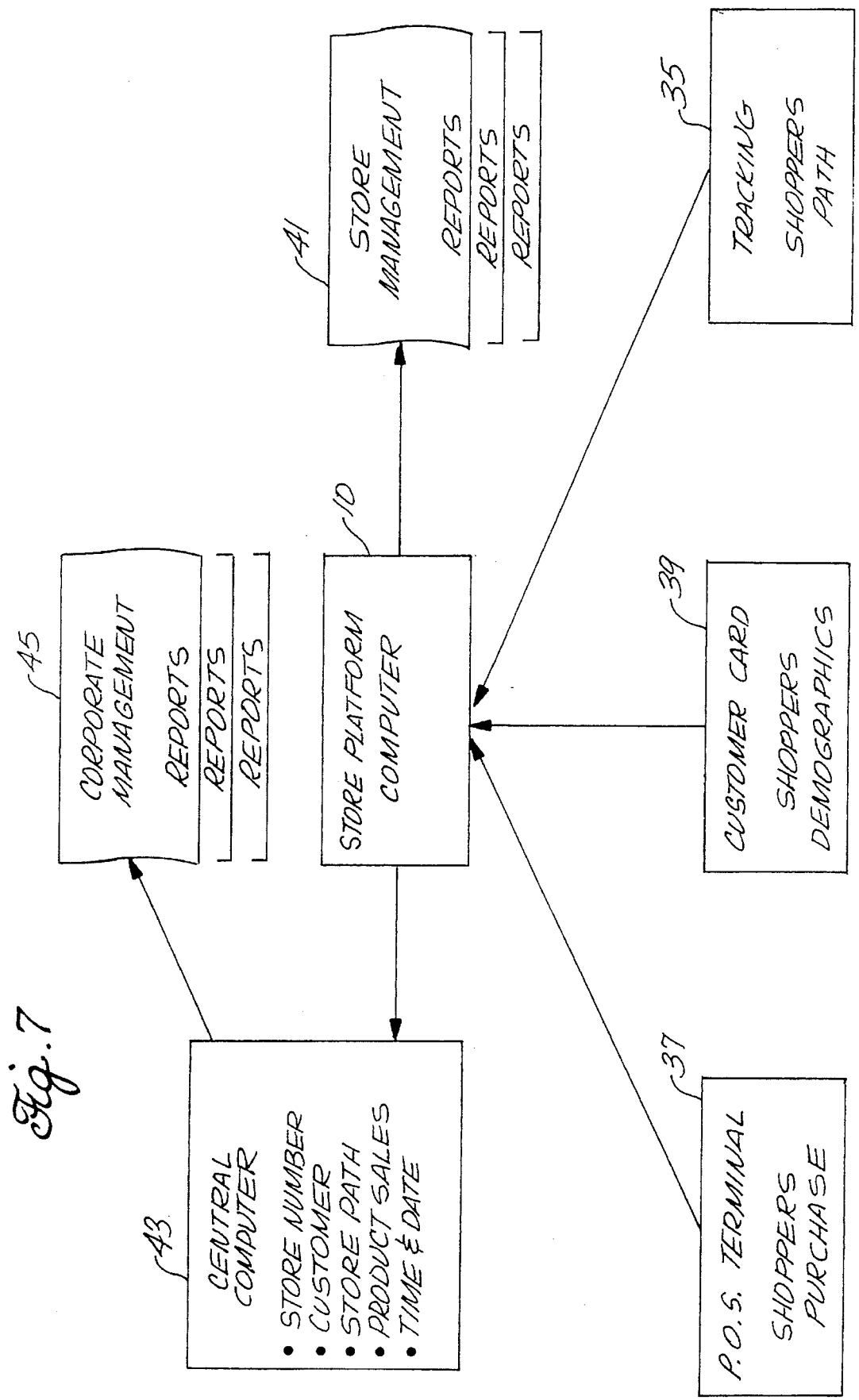

REMOTE ELECTRONIC INFORMATION DISPLAY SYSTEM FOR RETAIL FACILITY

CROSS REFERENCE TO RELATED APPLICATIONS

This application is a continuation-in-part of application Ser. No. 08/083,389, filed Jun. 28, 1993, now abandoned which is a continuation of application Ser. No. 07/753,004, filed Aug. 23, 1991, now abandoned which is a continuation of application Ser. No. 07/427,896, filed Oct. 24, 1989, now abandoned which is a continuation-in-part of application Ser. No. 07/352,553, filed May 16, 1989, now abandoned. The above-mentioned applications are incorporated fully herein by reference.

FIELD OF THE INVENTION

This invention relates generally to an electronic information display and item tracking system, and, more particularly, to a computer based system for electromagnetic tracking the position of shopping carts and baskets, and displaying pricing, advertising, and other specialized information at remote display modules which are connected to a central computer.

BACKGROUND OF THE INVENTION

Most modern retail stores implement some form of computer technology in their operations. This typically consists of using point of sale (POS) systems for automating the checkout procedures. A POS system generally has one or more automated check-out terminals which is capable of sensing and interpreting the Universal Product Code (UPC) printed on each item of merchandise to be checked out. Each of these terminals is connected to a computer which processes the UPC information. The computer's data base includes a list of items of merchandise on sale, a UPC for each of these items, and various types of information, including pricing and inventory information, associated with each UPC. When a customer is ready to make a purchase, the store clerk simply uses an automated terminal to sense the UPC markings on each of the customer's selections. The computer interprets the UPC, looks up the price for each item, and keeps a running total of the purchase. For a chain of retail stores, each of the store platform computers are often linked to a central computer. This allows the data base of each store to be modified by changing only the date base of the central computer.

In a store, merchandise offered for sale is typically displayed in some way, usually by placing the merchandise on a shelf. Plastic or paper pricing indicators are commonly mounted in proximity to the merchandise to notify customers of its price. Pricing indicators often include information such as size, weight, unit price and other identifying information.

When a change in price is made to one or more of the merchandise items, two things must occur. First, the computer's data base must be modified to reflect the price change. As soon as this change occurs, the new price will automatically be charged to customers at the check-out terminal. Second, the price indicator for each of the affected items must be changed. It is desirable to change the data base and the indicated price at the same time so that there are no discrepancies.

There are many disadvantages with this type of setup, the main one being that whenever any of the indicator information has to be changed, it must be done so manually. This requires that new pricing tags must be ordered, printed and delivered to the store and then manually placed on the store shelves. Associated with this procedure is the cost of printing and delivering indicators and the labor cost to replace out of date pricing indicators. This is especially disadvantageous where price changes occur often.

Many stores also use alternative means to convey pricing and other information about merchandise to its customers. Some stores use handwritten or pre-printed displays that are somewhat larger than the tags that are used on the shelves. These displays may be self-standing and portable or may be fixed to a shelf or a ceiling. With each of these methods, however, the store is faced with the cost of printing and installing the displays each time they are changed.

U.S. Pat. No. 4,002,886 to Ronald M. Sundelin dated Jan. 11, 1977 discloses an electronic price read out system in which preprinted price indicators are replaced by electronic price indicator units. The information displayed by these units can be changed at will by changing the electrical stimulus at the input of each unit. Each of the electronic price indicator units is connected to the same computer that supplies prices to the POS terminals. This way the system assures that whenever the price of an item is changed in the computer's data base, both the price displayed and the price charged at the check-out terminal are automatically changed to the new price. The Sundelin patent discloses that the computer is connected to the price indicator units using four conductors or wires. This feature makes the system difficult to implement as it requires wires to be routed throughout the store. In order for the computer to differentiate between the many price indicator units, each unit is assigned a unique address. Correlation in the computer database between the price indicator unit address and the price to be displayed is achieved either by manually entering the information into the computer via its keyboard or by using a remote unit connected to the store computer, having a keypad for entering information, and scanning means for sensing and interpreting UPC markings on items of merchandise.

U.S. Pat. No. 4,766,295 to Malcolm H. Davis discloses a similar system; however, the store computer is connected to the price indicator units via an infra red communications link. One disadvantage to the system disclosed in the Davis patent is that there is only a one way communication between the computer and the price indicator unit. That is, the system only allows for information to be transmitted from the computer to the price indicator unit. Another disadvantage is that all price indicators are receiving data whenever any price indicator is receiving its specific data. This increases power consumption which becomes critical to system operation when the price indicators are battery operated.

Most modern retail stores implement some method of tracking the path customers take while shopping, to determine shopping habits and effect of advertising, product placement, etc. Ideally store-wide information should be collected and analyzed daily. The only method currently available is manual, and is usually accomplished by store personnel armed with a stop watch and counter observing and recording traffic in an aisle. This activity is cumbersome, time consuming and costly. Therefore customer tracking is used on a limited basis.

SUMMARY OF THE INVENTION

The present invention provides an integrated pricing, advertising, and tracking system for displaying current pricing information as well as advertising information on remote display terminals, and tracking customer activity throughout a store. The system has a store platform computer which provides a data base for pricing, advertising, and tracking information within each store. The store platform computer is connectable to a central computer which may be located off-site. A plurality of point of sale (POS) terminals are linked to the store platform computer. A plurality of electronic price information display tags are mounted throughout the store at various merchandise locations. Battery operated tracking transmitters are attached to a plurality of shopping carts and baskets which may be moving throughout the store. Each display tag is battery powered and contains a transceiver for communication with the store platform computer. Communication between the store platform computer and the display tags and tracking transmitters is facilitated with an IR controller and an IR transceiver grid. The IR transceiver grid is comprised of a plurality of individual transceivers placed throughout the store and it is electromagnetically linked to the tracking transmitters and the transceivers resident in each of the electronic display tags. The IR controller is a microcomputer-based terminal which is hardwired to both the store platform computer and the IR transceiver grid. The IR controller regulates the transmission and reception of data to and from the IR transceiver grid. A portable terminal which is coupled to and can communicate with both the store platform computer and the electronic display tags is used to initialize display tag addresses. Included in the system are portable electronic display terminals with IR transceivers for communication with the store platform computer as well as display terminals that are hard wired to the IR transceiver grid.

According to a feature of the invention, the IR transmitters, transceivers and the display tags are all individually addressable. As a result of this double level of addressability, only the IR transceiver or transceivers actually communicating with the display tags are addressed and transmit IR signals. Thus, when the display tags are configured to have a low gain standby mode and to switch to a high gain mode only when receiving IR signals, battery power for the display tags is conserved because only those display tags in the vicinity of the display tag to be addressed are switched to the power consuming, high gain mode.

According to another feature of the invention, twoway communication is established between the IR transceiver grid and the display tags so that the price data to be displayed by the display tags or an error check signal can be transmitted back to the IR controller to verify that the correct price data has been received by the display tag.

According to another feature of the invention, as each individually addressed transceiver in the grid receives a signal from a tracking transmitter it communicates this information through the IR controller to the store platform computer for processing.

BRIEF DESCRIPTION OF THE DRAWINGS

These and other features and advantages of the present invention will be better understood by reference to the following detailed description when considered in conjunction with the accompanying drawings, wherein:

FIG. 7 is a block diagram of the information collection function in the cart tracking system.

DETAILED DESCRIPTION OF THE INVENTION

The invention comprises a system for communicating between a store computer and locations in the aisles of a retail facility. A hard wired grid connects the store computer to a plurality of transceivers located in zones throughout the facility and the transceivers establish a wireless link to the locations. One embodiment is a product information display system in which the locations are fixed information display terminals, such as price displaying shelf tags. Another embodiment is an item tracking system, in which the locations are movable shopping carts or baskets, hereafter collectively called "shopping carts". The two embodiments can be used individually or together. In the latter case, the described hardware can be used with both embodiments, separate software being provided for each embodiment.

Figure 1:
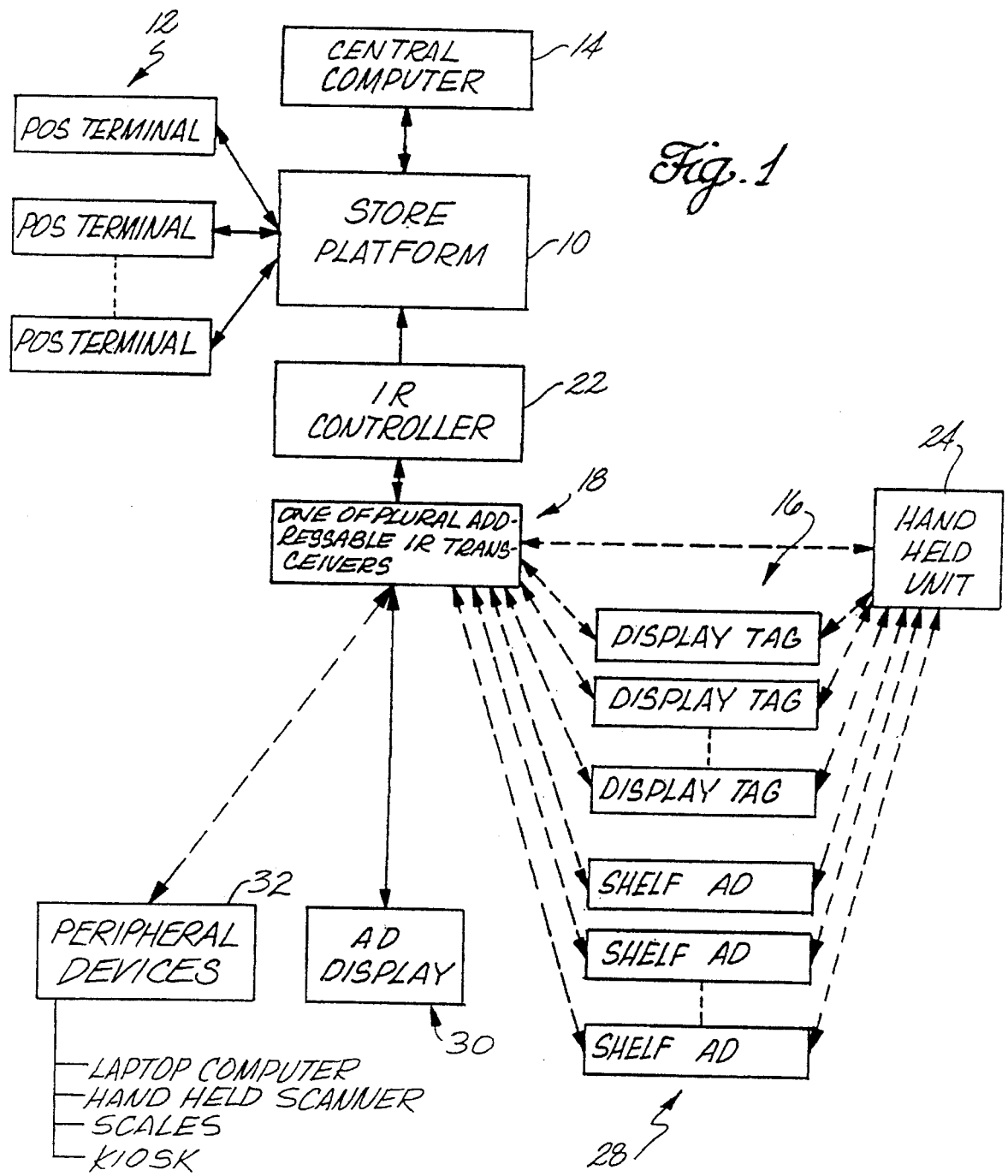
FIG. 1 is a schematic block diagram of the information display system.

Referring to FIG. 1, a block diagram of the price information display system is shown. The store platform computer 10 provides a data base for all of the merchandise in the store. The data base associates each item of merchandise with, among other things, the price of the item, and its (UPC). The store platform computer 10 is electrically connected to a plurality of point of sale (POS) terminals 12. The POS terminals are used to sense the UPC code on the items of merchandise, the UPC is interpreted by the POS terminal, and compared against its data base, supplied by the platform computer, for all store items. The price associated with that particular UPC code is found and added to the running total of the purchase.

Price changes may be made in the data base at the store platform level; however, if the store platform computer is linked to another computer 14, one that serves as a central computer to a plurality of store platform computers, then price changes can be made at the central computer 14 and downloaded to each of the store platform computers 10.

The store platform computer also supplies data, in addition to providing data to the POS terminals, to a plurality of electronic display tags 16. Display tags are used to convey pricing and other information about the particular item of merchandise the tag is associated with.

The display tags have the ability to store and then display information as a function of time. This ability allows price changes and other information to be displayed at a specific time and day without the need of communication with the tag at that specific time and day. This feature makes it possible for relatively instantaneous changes to all tags even though the system may have slow data communication rates. In addition, power consumption of the tag is reduced since the largest power consumption exists when communication is taking place. One communication can program many changes in displayed information.

The information display system is integrated into the POS system by adding to the described POS system an IR controller as well as communications software both within the IR controller and the Store Platform computer. The assembly language listing of the application code for the IR controller is attached under Appendix A to application Ser. No. 07/352,553 and is hereby incorporated by reference. The application program listing for the store platform computer is attached in Appendix B and is hereby incorporated by reference.

Figure 2:
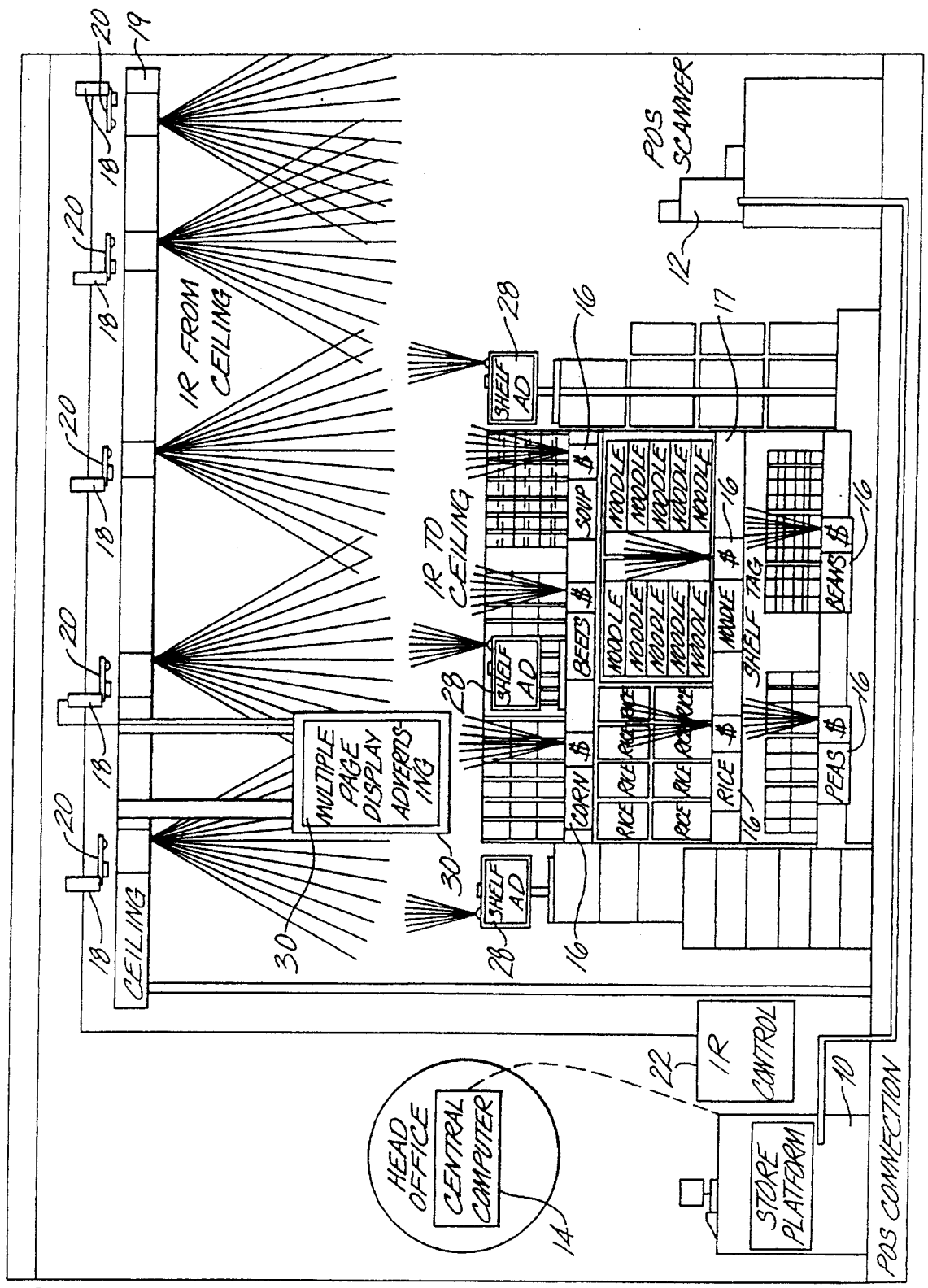
FIG. 2 is a block diagram of the specific elements of the electronic information display system shown in their operative relationship with each other.

In an exemplary embodiment, referencing FIGS. 1 and 2, merchandise is placed on shelving 18 within the store and an electronic display tag is mounted on the shelf adjacent to each item of merchandise. Each of the display tags may indicate various information relating to that particular item, such as the total cost, the cost per unit, the size or weight, etc.

Each of the electronic display tags contain an infrared (IR) emitter for transmitting data and an IR sensor for receiving data. Each tag is uniquely identified by a binary address which is stored in random access memoryRAM within the tag. This allows the address of the tag to be changed from time to time. The electronic display tags are powered by a battery which operates the IR sensor in two modes. To reduce battery power consumption, the IR sensor amplifier is normally maintained in a low gain mode. When an IR signal is radiated toward the display tag, the IR sensor amplifier is switched to a high gain mode. By way of example, a high gain mode could be enabled or energized periodically to detect when an IR signal is present. If during an enabled period an IR signal is received, the IR sensor receiver is maintained in the high gain mode for a predetermined time period after the IR signal ceases.

The electronic display tags communicate with a grid of IR transceivers 18 which, in an exemplary embodiment, are housed in the ceiling of the store. Only one of the IR transceivers is illustrated in FIG. 1. The IR transceiver grid is made of an array of IR emitters and IR sensors 20 which are positioned at selected positions in the ceiling 19. It is not necessary to have a direct line of sight between the transceivers in the display tags and the transceivers in the ceiling since infrared signals may be reflected. The number and location of the IR emitters and IR sensors in the IR transceiver grid depends on the number and location of the electronic display tags. In any case, each IR transceiver 18 communicates with only a relatively small number of the total number of display tags 16 in the store. For example, if the store has 20,000 display tags, there could be 300 IR transceivers each communicating with about 50 to 75 display tags in its vicinity, the grid of IR transceivers being spaced apart six to eight feet and overlapping somewhat the display tags with which they communicate.

The IR transceiver grid 18 is connected to the IR controller 22 which is in turn connected to the store platform computer 10. The IR controller is a microcomputer-based terminal that controls transmission from and reception of the IR transceiver grid. The IR controller provides two basic functions. It converts parallel binary data into a serial stream of coded data for transmission from the IR transceivers. The IR controller also converts coded serial data from the IR transceivers to parallel binary data.

The IR transceiver grid and electronic display tags are also capable of communicating with the hand held unit 24. The hand held unit has an IR emitter and an IR sensor for communicating with other transceivers, a keypad for entering information, and scanning means for sensing and interpreting UPC markings on items of merchandise.

When a new item is added to the store's inventory, the hand held tag is used by an operator to initialize the electronic display tag so that the tag will display information pertaining to only that item of merchandise. First, the clerk uses the hand held unit to scan the UPC marking on the new item. The UPC is then transmitted from the hand held unit to the store platform computer via the IR link between the hand held unit and the applicable IR transceiver. The computer processes the UPC and assigns a display tag identification code for the tag for that item at that location and the product identification code is transmitted back to the hand held unit via the IR link. The operator then uses the hand held unit to inject the code into the electronic display tag. This is done optically via the wireless link between the IR emitter in the hand held unit and the IR sensor in the electronic display tag. In order to avoid miscommunication with a nearby display tag, the hand held unit must be held in close proximity to the display tag. The hand held unit then advises the store platform computer that the download is complete. Once complete, the tag is able to communicate to the store platform computer via its own transceiver.

During this initialization process, additional information may be supplied to the data base. For example, the operator may use the hand held unit to tell the store platform computer where the item is located in the store.

The information supplied to the electronic display tag remains intact until it is changed on command by the store platform computer. For example, when the price of an item changes, the price change is entered into the store platform computer by an operator. Once the data base changes, the new price is available for the POS terminals. The operator will also instruct the store platform computer to update the price on the electronic display tag which is associated with that item. The store platform computer will send a message containing the price change over the IR transceiver addressed to the appropriate electronic display tags.

In the preferred embodiment, there are two levels of addressability. IR transceivers 18 are each assigned unique addresses and display tags 16 are each assigned unique addresses. A particular IR transceiver will only transmit an IR signal to the display tags in its vicinity if it first receives a message word having an address that matches the address assigned to the IR transceiver. Thus, fewer than all the IR transceivers usually transmit IR signals and only those display tags in the vicinity of such IR transceivers are switched to the high gain mode. As a result, battery power is conserved. As described above, only the display tag assigned the address that matches the address of the IR signal responds to the display tag data carrier by such IR signal.

Figure 3:
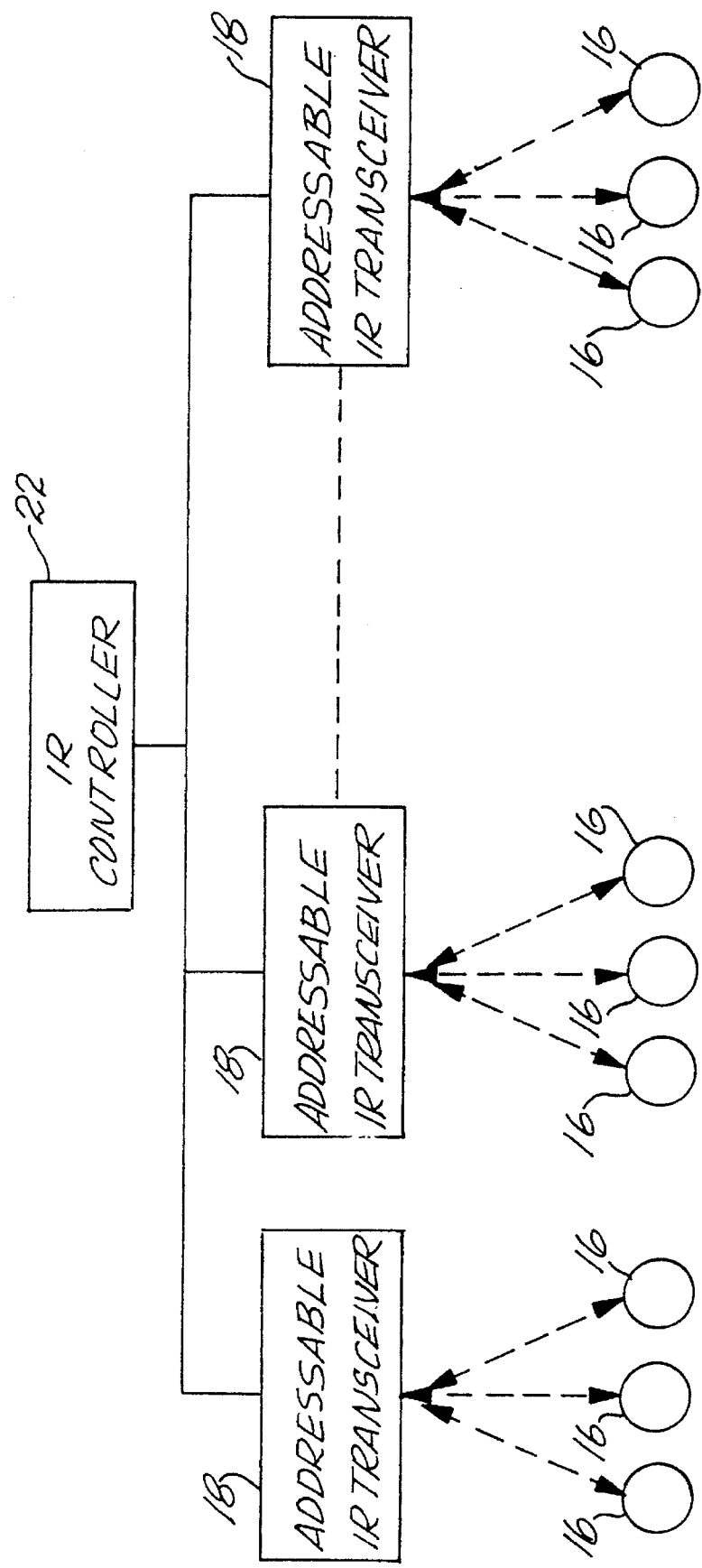
FIG. 3 is a schematic diagram of the IR controller, the IR transceiver grid, and the display tags.

As illustrated in FIG. 3, display tags 16 transmit to and receive IR signals from IR transceivers 18 in their vicinity. Some price tags may receive IR signals from more than one transceiver, but, nevertheless, in the preferred embodiment, fewer than all of them to conserve battery power. An instruction field determines what such display tag does with the display tag data field, e.g. changes the displayed price. Two-way IR transmission takes place between the IR transceivers and the display tags. Message words having the display tag address and the display tag data are transmitted from the IR transceivers to the display tags, and signals to verify receipt of correct display tag data are transmitted from the display tags to the IR transceivers. Preferably, the verifying signal is a simple data-valid signal comprising a unique code word of several binary bits, which is sent by a display tag when the display tag data it receives satisfies a parity check. Alternatively, although it would consume more battery power, the verifying signal could comprise a retransmission of the display tag data to the IR transceiver for comparison with the data it had sent. In either case, the display tag data is retransmitted by the controller if the verifying signal is not received by the IR transceiver.

Figure 4:
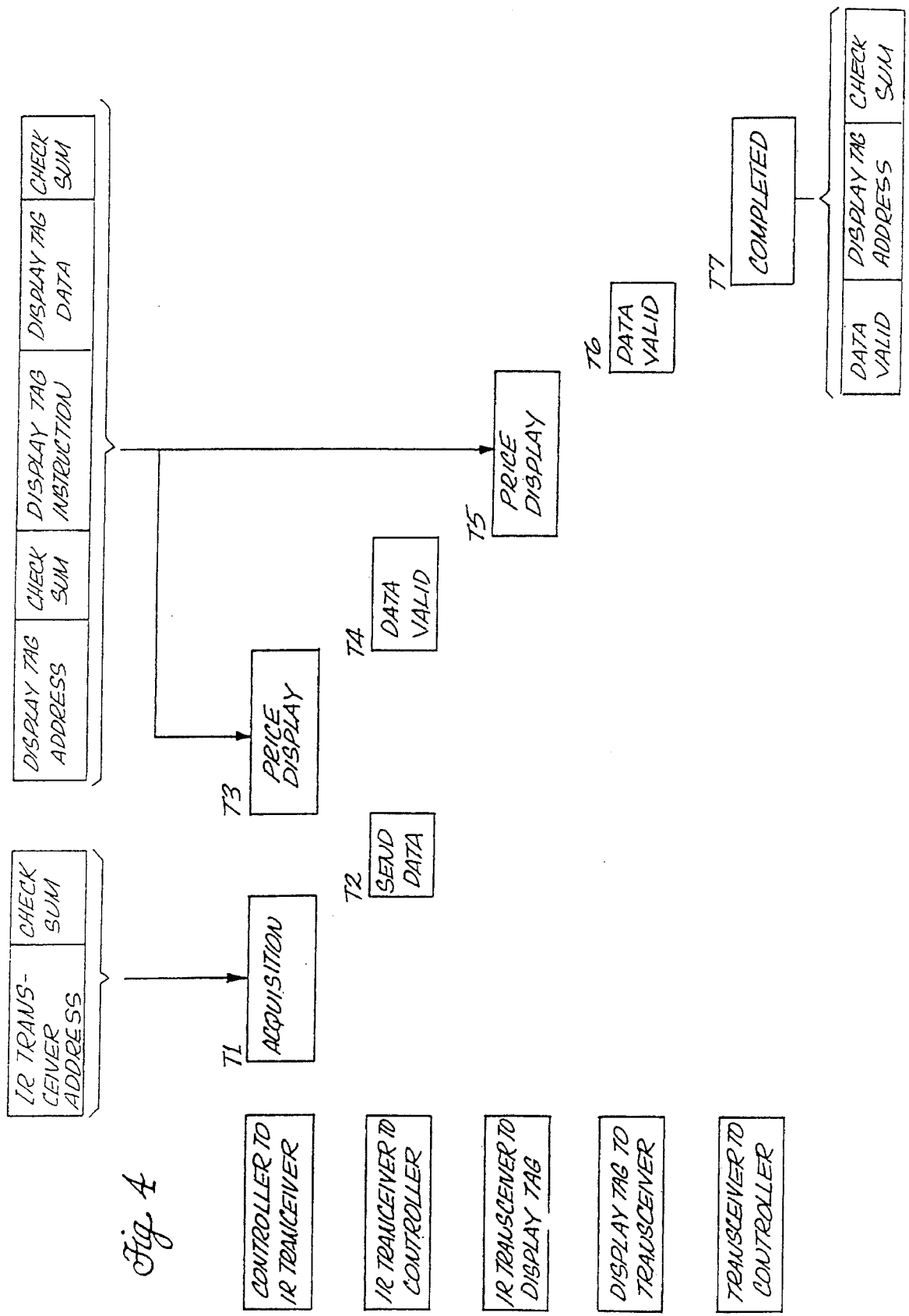
FIG. 4 is a diagram of the message words transmitted between the IR controller and the display tags via the IR transceiver grid and the timing of such message words.

As shown in FIG. 4, when new display tag data is to be sent to a display tag, the controller transmits an acquisition signal to all the IR transceivers at a time T1. The acquisition signal has an IR transceiver address field and a check sum field that carries parity bits to verify that the correct acquisition signal has been received by the IR transceivers. At a time T2, the addressed IR transceiver transmits a send data signal to the controller if parity checks. Then, at a time T3, a display tag signal is transmitted by the controller. Only the addressed IR transceiver, i.e. the transceiver that transmitted the send data signal, responds to the display tag signal. The display tag signal has a display tag address field, a check sum field that carries parity bits to verify that the correct display tag address has been received, a display tag instruction field that defines the function to be performed, a display tag data field that defines the price or other data to be displayed by the tag, and a check sum field that carries parity bits to verify that the correct display tag data has been received. The instruction field could identify the type of data in the display tag data field and how it is to be used by the display tag. At a time T4, the addressed IR transceiver transmits a data valid signal to the controller if parity checks. At a time T5, the addressed transceiver transmits to the display tags in its vicinity an IR signal modulated with the display tag signal. At a time T6, the addressed display tag transmits a data valid signal to the IR transceiver.

The data valid signal is one binary value if parity checks and another binary value if parity does not check. At a time T7, the addressed transceiver transmits a message completed signal to the controller. The message completed signal has a data valid field that carries the binary value transmitted at time T6, a display tag address field, and a check sum field that carries parity bits to verify that the correct message completed signal is transmitted to the controller. If the data valid field of the message completed signal received by the controller indicates that parity does not check, i.e. that the display tag data received by the display tag is incorrect, the controller repeats the described sequence until the data valid field does indicate a parity check. If the send data signal at T2 or the data valid signal at T4 is not received by the controller or the message completed signal at T7 received by the controller does not satisfy the parity check, the controller also repeats the described sequence. If desired, an alarm could be actuated after the sequence is repeated unsuccessfully a given number of times, e.g. ten times.

In the other embodiment, the item tracking system, the store platform computer receives data from a transceiver in the transceiver grid when that transceiver receives address data from a movable tracking transmitter. Each transceiver and tracking transmitter have unique addresses making it possible for the tracking software contained within the store platform to track the path traveled by a specific tracking transmitter. The tracking transmitters are mounted on shopping carts, thereby making it possible to track the path taken by a specific cart hence a specific customer as it traverses the store.

The platform computer contains a real time clock making it possible to determine when the tracking transmitter arrives at and departs from the zone covered by each transceiver, including when the cart arrives at the POS. Combining this information with the POS data it is possible to know what path was taken in the store, the products purchased, and in some cases the name of the customer.

The transmitters are battery operated and are attached to the shopping carts in the retail facility. These transmitters communicate to the platform computer, using the described transceiver grid, in substantially the same way as the display tags. Each transmitter transmits a series of three identical data transmissions, lasting less than 100 milliseconds once per second, as long as the cart to which it is attached is in motion. When motion ceases, transmissions cease. Enabling transmission only when the cart is in motion conserves battery power and reduces unnecessary redundant data flow to the store platform computer. Each data transmission from a tracking transmitter contains the transmitter's unique address, the battery status, and a check sum. Upon receipt of a valid transmission, the transceiver stores the address and battery status in memory and waits to be polled by the store platform computer to download transmissions received since the last poll. Software contained within the store platform performs the necessary manipulation of the raw data received via the transceiver grid to determine the location of each tracking transmitter in time and space, and stores this information in a file for easy access by other programs.

Preferably, the system also includes a means to read previously recorded demographic information about the customer associated with the sales transaction in progress at a specific POS terminal. This information is contained in a card, similar in appearance to a credit card, issued to the customer by the store or other agency. The customer's demographics, products purchased, and associated tracking transmitter address data is processed by software contained in the platform and stored in a file for easy access by other programs.

Preferably, the system also includes software at the store platform computer and/or the central computer to sort, combine, and manipulate the data contained in the time and space and the demographic and purchase files and to store and/or print the results.

Figure 5:
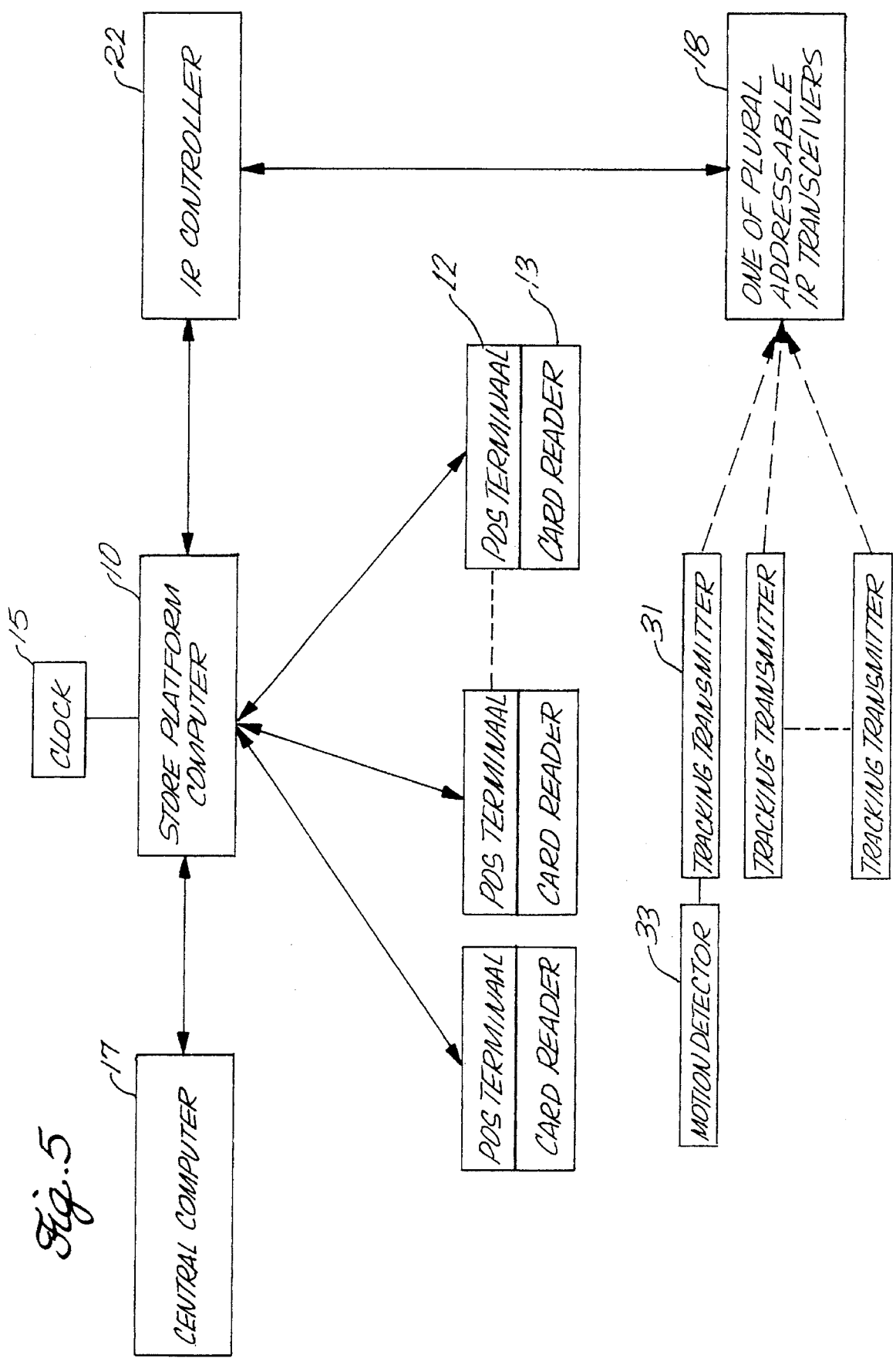
FIG. 5 is a block diagram of the cart tracking system.

In FIG. 5, a block diagram of the tracking portion of the system is shown. The tracking portion could be implemented separately or used together with the information display portion. In the latter case, the same IR grid functions in both portions. The tracking portion of the system utilizes the same transceiver grid 18 described in the information display section (FIG. 1 and FIG. 2) to receive signals from tracking transmitters 31, which are mounted on respective shopping carts. However, since the tracking transmitters 31 do not have corresponding receivers, only the receiving portion of the transceiver grid is utilized. The tracking transmitters 31 transmit a series of identical data transmissions, lasting less than 100 milliseconds, on a non-synchronized periodic basis, e.g., once each second. Each transmission comprises the unique address, the battery status and a check sum. Each tracking transmitter 31 has a motion detector 33. The power from the battery is only applied to one of the tracking transmitters 31 when corresponding motion detector 33 senses that the shopping cart is moving.

The transmissions intercepted by transceivers 18 are sent to the IR controller 22 by the IR grid. The IR controller 22 sends the information to the store platform computer 10. An IR link from each POS terminal to the store computer is also established so the shopping cart being checked out can be identified. A card reader 13 is located at each POS terminal 12 to permit identification of the customer. Information, including product identification, price, shopping cart identification, and customer identification, is also sent to store platform computer 10 by POS terminals 12. A clock 15 tags the time when the information is received by computer 10 from transceivers 18 and POS terminals 12, and thus fixes the timing of the events. The store computer 10 sends the information to a central computer 17, which serves all the retail facilities of the network.

Figure 6:
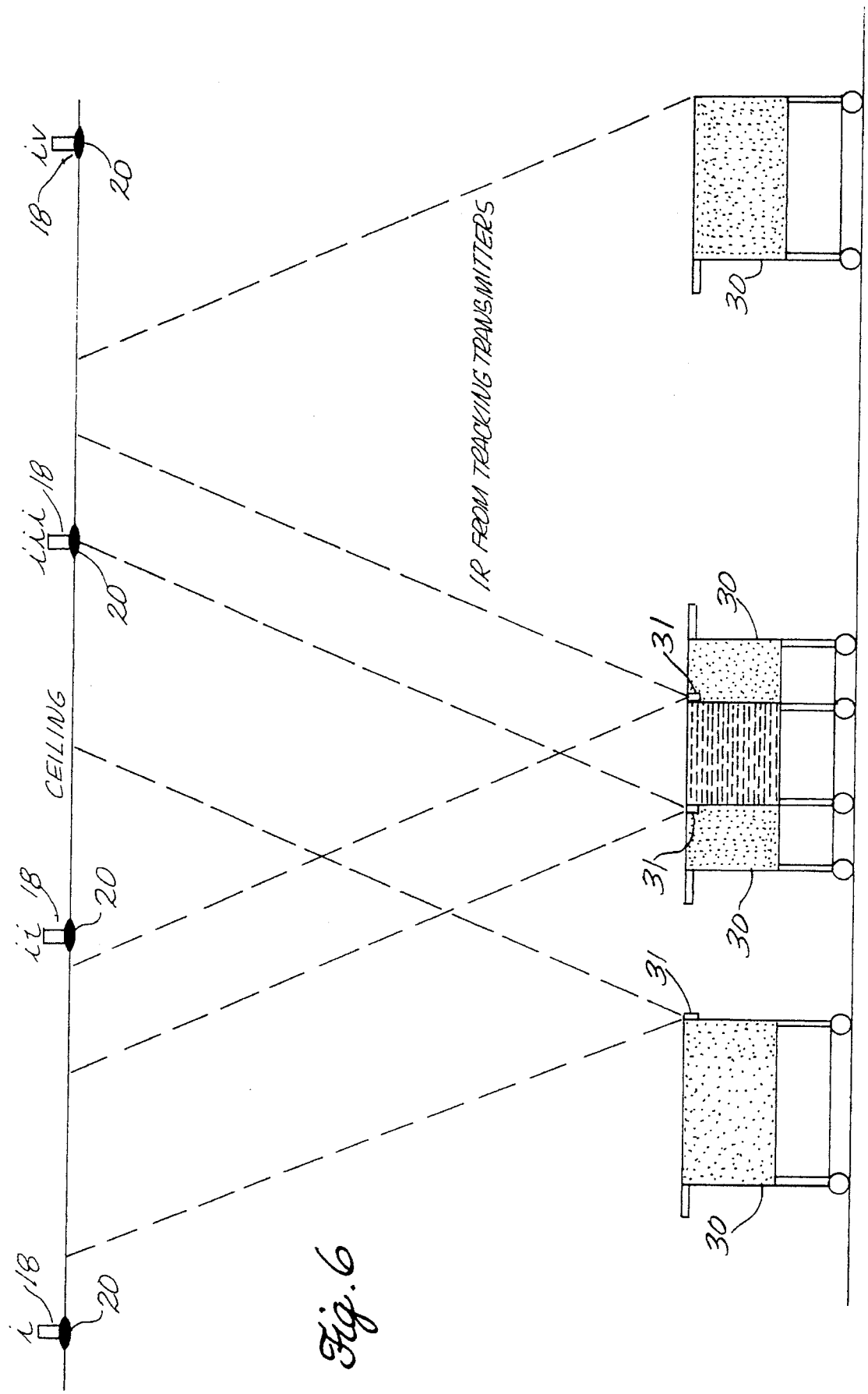
FIG. 6 is a schematic block diagram of the cart tracking system.

In FIG. 6, a typical application of cart tracking is shown. Upon receipt of a valid transmission from a tracking transmitter 31, the receiving transceiver 18 sends its unique address and the address of the received tracking transmitter to the store platform computer 10. Since each transceiver and tracking transmitter have unique addresses and the store platform computer 10 has a real-time clock, the tracking software in the store computer 10 can track the position of the tracking transmitters 31 with respect to time. Attaching a tracking transmitter to a shopping cart 30, a shopping basket, or a customer makes it possible to track the path taken by the customer while shopping, including the arrival at a specific POS terminal 12. For example, in FIG. 6, the infrared energy radiated from the tracking transmitter 31 attached to the shopping cart designated A is received by transceiver 18ii. The energy radiated from the tracking transmitter 31 attached to the shopping cart designated B is received by transceivers 18ii and 18iii. The energy radiated the transmitter 31 attached to the shopping cart designated D is received by transceiver 18iv.

In FIG. 7 is illustrated a block diagram of information flow within the tracking system of FIGS. 5 and 6. Tracking information represented by a block 35 comprises transmitter position information derived from the transceiver grid. POS terminal information represented by a block 37 comprises data on the products purchased from the POS terminals and the identification of the shopping card that made the purchases. Thus, the actual purchases can be linked to the path taken by the shopping cart in the store. Customer card information represented by a block 39 comprises customer identification. The information from blocks 35, 37, and 39 is transmitted to the store computer 10 where it is stored. This information can be used to produce management reports locally and/or be sent to the central computer for manipulation and report generation. Reports such as the percentage of shopping traffic in a specific aisle at a specific day and time, and traffic increase or decrease resulting from price changes or advertising, can be generated. The customer identification is linked with previously recorded demographic data about the customer. This adds another dimension to the system's ability to analyze the cause and effects of stimulus to sales. Data can be manipulated and sorted as a function of price, product location, advertising, customer demographics, store and product location, environment, etc.

The purpose of the unique addresses assigned to transceivers 18 is permit them to individually communicate with and be separately identifiable by store computer 10. In the product information displaying embodiment, this permits store computer 10 to actuate only the transceiver 18 covering the zone in which the shelf tag to be updated is located. In the item tracking embodiment, this permits store computer 10 to identify the zone in which movable items are located. Rather than have the unique addresses take the form of a transceiver address field that carries binary identifiers, they could be radio frequency carriers on which the information (price and/or location address) is modulated or a time shared arrangement in which the transceivers are scanned by store computer 10 in a predetermined, synchronized sequence. Alternatively, the unique addresses take the form of a separate wire connection for each transceiver 18, the transceiver being identified to the store computer by the particular wire connection on which the signal is sent to or by the store computer.

In the described embodiment, each of the electronic display tags have a separate transceiver. In an alternate embodiment of the present invention, a group of electronic display tags, each having their own unique address, are connected to one regional transceiver. Each of these regional transceivers has associated with it, control circuitry to demultiplex the incoming information to the appropriate electronic display tag. For example, a regional transceiver is located at each aisle of shelving. That transceiver receives and transmits all of the information related to the display tags mounted on that particular aisle.

In an exemplary embodiment of the present invention, the system also includes display and advertising mechanisms in addition to the display tags. For example, information is displayed on movable display screens 28 which are substantially larger than the display tags. These screens operate in substantially the same way as the display tags, being programmable and having a self contained transceiver for communication with the hand held unit and the store platform computer. Additional screens 30 may be hardwired to the IR transceiver for direct communication with the store platform computer. Further, the display screens may either be battery powered or connected to a facility power source.

The preceding description has been presented with reference to the presently preferred embodiment to the invention shown in the drawings. Workers skilled in the art and technology to which this invention pertains will appreciate that alterations and changes in the described structures can be practiced without departing from the spirit, principles, and scope of this invention.

What is claimed is:

1. An inproved energy efficient, electronic merchandise price display system having at least two levels of sequential addressability for a retail store having a plurality of point-of-purchase (POP) locations at which items of merchandise are available for purchase, the system comprising:

a plurality of individually addressable battery powered electronic price information display tags mounted at the respective locations, said display tags being normally maintained at a first low power mode and being temporarily switchable to a second high power mode in response to receipt of an infrared signal, a store platform computer for coordinating price, product, and location data at the retail store;

a plurality of point-of-sale (POS) terminals linked to the computer;

a plurality of individually addressable infrared transmitters having different fields of view distributed above the store collectively to cover the store, each infrared transmitter having a unique address assigned thereto, wherein the number of transmitters is less than the number of display tags and each transmitter communicates with a plurality of display tags;

hardwired means for coupling the computer to the transmitters to transmit from the computer to the transmitters a signal having a first field in which an address assigned to one of the transmitters is stored and a second field in which price information and a tag address are stored;

means for controlling one of the transmitters to selectively transmit an infrared signal containing the second field to the tags responsive to the transmitter address in the first address field so only the transmitter designated by the address in the first field transmits the infrared signal;

means responsive to the receipt of the infrared signal to temporarily switch selected ones of said display tags to said second high power mode, and means at one of the display tags for displaying the price information from the second field responsive to the tag address in the second field.

2. The price display system of claim 1, in which the plurality of infrared transceivers transmit a binary infrared signal.

3. The price display system of claim 1, in which the display tags store information and additionally include means to display the stored price information at a time predetermined by a display tag instruction data.

4. The price display system of claim 1, in which all the tags store price information over a period of time and display the second price information instantaneously at a time predetermined by a display tag instruction data of said second field.

5. The price display system of claim 1, in which the infrared signal additionally has a check sum field and the addressed tag determines if the price information is valid based on the check sum in the check sum field.

* * * * *

UNITED STATES PATENT AND TRADEMARK OFFICE
CERTIFICATE OF CORRECTION

PATENT NO. : 5,572,653
DATED : November 5, 1996
INVENTOR(S) : William C. DeTemple; Peter Abell; E. Frederick Bird; Milton L. Goff It is certified that error appears in the above-indentified patent and that said Letters Patent is hereby corrected as shown below:

Column 3, line 44, change "twoway" to -- two-way --.
Column 5, line 18, change "memoryRAM" to -- memory RAM --.
Column 12, line 3, replace "second price" with -- stored price --.

Signed and Sealed this

Twenty-first Day of October 1997

Attest:

BRUCE LEHMAN

Attesting Officer

Commissioner of Patents and Trademarks